C. W. SIRCH.
CURRENT RECTIFYING SYSTEM.
APPLICATION FILED JAN. 16, 1907. RENEWED OCT. 10, 1907.
1,133,447.
Patented Mar. 30, 1915.
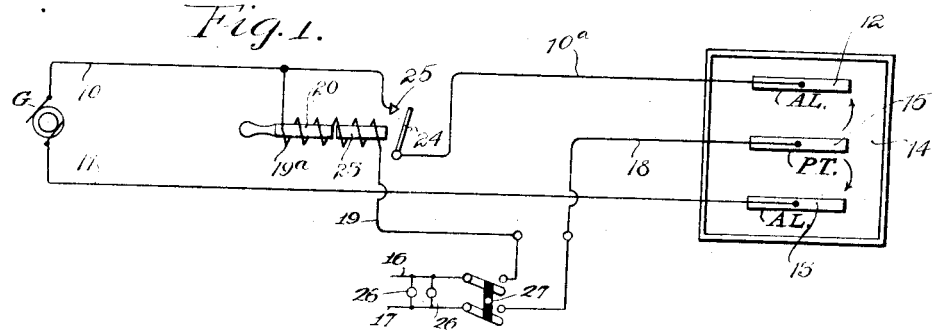
Witnesses:
Arthur H. Boettcher,
Charles J. Schmidt
Inventor
Charles W. Sirch
By Charles A. Brown
Attorney

UNITED STATES PATENT OFFICE.

CHARLES W. SIRCH, OF LOS ANGELES, CALIFORNIA.

CURRENT-RECTIFYING SYSTEM.

1,133,447.  Specification of Letters Patent.  Patented Mar. 30, 1915.

Application filed January 16, 1907, Serial No. 352,492. Renewed October 10, 1907. Serial No. 396,774.

*To all whom it may concern:*

Be it known that I, CHARLES W. SIRCH, citizen of the United States, residing at Los Angeles, in the county of Los Angeles and State of California, have invented a certain new and useful Improvement in Current-Rectifying Systems, of which the following is a full, clear, concise, and exact description, reference being had to the accompanying drawings, forming a part of this specification.

My invention relates to current rectifiers and more particularly to an improved arrangement, the operation of which will be reliable and efficient.

The arrangement and operation of my invention will be clearly understood by a reference to the accompanying drawing, in which—

Figure 1 is a diagrammatic view illustrating the arrangement which I propose; Fig. 2 shows the wave form which would be obtained by one part alone of the combination employed; and Fig. 3 illustrates a continuous direct current wave form as obtained by my system.

In Fig. 1, the mains 10 and 11 lead from an alternating current generator G. The lead 11 connects directly with the active electrode 13 of the electrolytic interrupter device 14, while the lead 10 connects with the contact 25 adapted to be engaged by armature 24, which connects with the other active electrode 12 through conductor 10ª.

Direct current translating devices 26, 26 connect with conductors 16 and 17 of a local direct current circuit. A double pole switch 27 serves to connect conductor 17 with conductor 18, which leads to the neutral electrode 15 of the interrupter device, and conductor 16 with conductor 19, which leads to the alternating current main 10 and includes the winding 19ª of a choke coil, this winding surrounding the core 23 placed proximate to armature 24. When there is no current flow through this winding, the armature 24 is disconnected from contact 25 to disconnect main 10 from the rectifier. However, upon current flow through said winding, the core becomes magnetized to attract the armature 24 against contact 25, thereby connecting main 10 with the electrolytic interrupter.

The principles and features of operation of my improved system are as follows: As is understood by those skilled in the art, the electrodes 12 and 13 are of some material, such as aluminum, to which current can flow, but from which current cannot flow. This being the case, the electrodes 12 and 13, with the electrode 15, form an electrolytic condensing interrupter, and upon current flow from the generating means with which the electrodes are connected, these electrodes will be charged, and upon breaking of the circuit or upon passage of the current from the positive to the negative field, or vice versa, the electrolytic condenser will tend to discharge. This operation I take advantage of in my system. For the purpose of illustration, suppose the generating means was set in operation to cause a current impulse to flow. The electrodes 12 and 13, being connected with the terminals of the generator (it being assumed that the local direct current circuit is closed and armature 24 attracted), will receive this charge, but there can be no current flow between the electrodes for the reason, as already stated, that it is impossible for current to flow from either of them. The current impulse, however, finds its way from the main 10 through the winding 19ª of the choke coil, through conductor 19, through conductor 16, through the translating devices 26, through conductors 17 and 18, through the anode electrode 15, through the electrode 13, and through main 11 back to the generator. As soon as a reversal takes place in the generator G, the electrolytic condensing interrupter, including the cathode electrodes 12 and 13, tends to discharge, and the circuit which I provide for receiving the discharge current flow includes the translating devices and the choke coil, being traced as follows: From electrode 12, through conductor 10ª, through winding 19ª of the choke coil, through conductor 19, conductor 16, translating devices 26, conductors 17 and 18, electrode 15, and through the electrolyte to the electrode 13, and this discharge current flows through the translating device in the same direction as the current which flows therethrough directly from the generator. This capacity discharge is affected and modified by the inductance of the choke coil, and in practice the capacity and inductance are so adjusted that the combined effect on the resultant current flow will be a complete filling in of direct current flow between the effective impulses of current flow from the generator. Upon cessation of effective current flow through the choke coil, the kick or discharge of the choke coil will also cause some current flow through the translating devices.

Fig. 2 illustrates the wave form which would result from the sole employment of the interrupter. o, o indicates the datum line. So far as the direct current circuit is concerned, only the impulses in one direction would be impressed, while the others are lost. The remaining features of my invention are directed toward filling in the gaps between the waves shown in Fig. 2. Referring now to the diagram of Fig. 3, o', o' indicates the datum line, x, x' represent current impulses formed directly from the generator to the translating devices, while y, y' represent current impulses supplied by virtue of the capacity and inductance effects. If the adjustment is properly made, the waves x and y, y and x', and x' and y' will connect; or, in other words, the current through the translating devices will be continuous and unidirectional. If the choke coil were not present, the resultant current formed between generator pulsations would be somewhat like that indicated by dotted lines in the figure just referred to, the condenser discharge being exceedingly rapid. The effect, however, of the inductance of the choke coil in the circuit is to spread out the current through the discharge circuit so that the current flow will be continuous. The current caused by the discharge or kick of the choke coil would not be sufficient to fill in the gaps between the generator pulsations, but by taking advantage of the capacity effect of the electrolytic device, the condenser discharge current, together with the kick current and the mutual effect of the inductance and capacity, will result in the complete filling in of the gaps to form a unidirectional current flow through the translating devices.

In Fig. 1, the core of the choke coil is shown as having a movable section 20, whereby the inductance effect can be regulated and adjusted. If the armature 24 were not provided, it would be necessary to provide a separate switch for disconnecting the cell from the generator, but, where this armature is provided, closure of the translating circuit will result automatically in closure of the branch 10ª and operative connection of the electrolytic cell with the generator. To start the system it is, therefore, only necessary to close the switch 27, whereupon circuit will be immediately closed through the choke coil winding and its armature attracted to connect the electrode 12 in circuit. The switch 27 could, of course, be omitted and individual switches placed at the translating devices. For example, these translating devices could be electric lamps, and then the mere turning of the lamp switch would close the circuit through the choke coil and set the system in operation.

Having thus described my invention, I claim as new and desire to secure by Letters Patent:

In a rectifying system of the class described the combination of an alternating current source, conductors leading from said source an electrolytic device connected with said conductors, a unidirectional current translating circuit connected with one of said conductors and with the electrolytic device, said electrolytic device acting to allow the pulsations of only one polarity to flow through the translating circuit, a choke coil causing a charge in the translating circuit from the alternating current source and permitting the discharge of the electrolytic device through the translating circuit after each cessation of current flow from the alternating current source, a contact and an armature actuated by said choke coil, the inductance of the choke coil and the capacity of the electrolytic device being so related to each other that the combined effect on the resultant flow of current through the translating circuit is a complete filling in of direct-current flow between the effective impulses of current from the alternating current source through the translating circuit.

In witness whereof, I hereunto subscribe my name this fifth day of Dec. A. D., 1906.

CHARLES W. SIRCH.

Witnesses:
J. JANFORTMELL,
L. AVISE.